UNITED STATES PATENT OFFICE.

JOHN ANTON UNGLAUB, OF COLORADO SPRINGS, COLORADO, ASSIGNOR OF ONE-HALF TO CARL L. GUSTAVSON, OF COLORADO SPRINGS, COLORADO.

PAINT COMPOSITION.

1,129,764.   Specification of Letters Patent.   Patented Feb. 23, 1915.

No Drawing.   Application filed October 26, 1912. Serial No. 727,968.

*To all whom it may concern:*

Be it known that I, JOHN A. UNGLAUB, a citizen of the United States, residing at Colorado Springs, in the county of El Paso and State of Colorado, have invented a new and useful Paint Composition, of which the following is a specification.

The present invention relates to improvements in paints, the primary object of the present invention being the provision of a paint in which the various weather resisting materials or component parts are spread over a greater area for a given amount and whereby the wearing quality of the paint is increased.

It has been found that when the present compound which primarily includes a solution of water and zinc sulfate and kerosene oil, when mixed with a colored paint composed of linseed oil and other necessary ingredients, will not cause any detrimental effect upon the coloring, and at the same time the surface produced with the present compound and the paint will dry exceedingly hard, and will not peel, flake or become chalky. It has also been found that the gloss obtained by a paint including the present compound will remain in such desired condition for two or more years, thus rendering the same more durable than the present day paints. This result is obtained only by the combination of the mixture of sulfate of zinc solution and kerosene oil and cannot be obtained by the introduction of either one of the ingredients without the other.

In compounding or mixing the present paint, to one gallon of white paint, made from pure white lead and linseed oil to the proper consistency for spreading, is added two ounces of a solution of sulfate of zinc in soft or rain water, said sulfate of zinc solution being of the strength stated hereinafter. This solution is thoroughly stirred into the paint until it apparently disappears, requiring in lead paints approximately ten minutes. One quart to one and a half quarts of soft or rain water is now added to the bulk and stirred until the water is thoroughly commingled and after such commingling, one half pint of kerosene oil is added and thoroughly commingled with the mass. The paint under these conditions will be ready to apply with a brush.

If the weather be cold and the paint too thick, more kerosene is added to thin. Linseed oil is added for outside work, while turpentine is added for inside work.

In forming the sulfate solution, the preferable quantities used are one pound of zinc sulfate to one gallon of soft water, the sulfate of zinc being thoroughly dissolved therein and the final solution filtered.

Where the paint is made from dry colors, double the quantity of the sulfate of zinc solution is used and is added when the colors have been mixed with linseed oil, one half gallon of soft water being thoroughly mixed and stirred with the mixture after the sulfate of zinc solution has been stirred therein. The kerosene as before is added to this mixture.

It has been found in practice that the water added, as set forth, after the stirring in of the sulfate of zinc solution, together with the kerosene, assists in thickening the paint and increases its bulk, so that more surface can be covered without decreasing the wearing qualities of the paint.

The kerosene oil will prevent the paint from chalking and rubbing off and does not interfere with the gloss surface imparted by the linseed oil. It also assists in the easy spreading of the paint and increases the surface area.

The sulfate of zinc is a drier for the paint and also assists in the wearing qualities of the final dried surface.

A paint mixed according to the above directions has been left standing for a period of six months and at the end of that period, the water has not separated, the same being held within the mass owing to the sulfate of zinc solution and the kerosene oil.

What is claimed is:

1. A paint having a solution of sulfate of zinc in water, kerosene and water mixed therewith.

2. A paint composed of a pigment, a siccative oil, a solution of sulfate of zinc in water, soft water, and kerosene oil.

3. A paint composed of a pigment, boiled linseed oil, a solution of sulfate of zinc in water, kerosene oil and water.

4. The herein described process of mixing paint, consisting in thoroughly commingling with a mixture of a pigment and linseed oil a solution of sulfate of zinc in water; adding thereto and commingling therewith water; and adding thereto and commingling with the above, kerosene oil.

5. A paint composed of a pigment and siccative oil, combined with a solution of sulfate of zinc in water, and kerosene oil.

6. A paint composed of a pigment and siccative oil, combined with a solution of sulfate of zinc, soft water; approximately one fourth of the combined pigment and siccative oil, and kerosene oil of about one half the quantity of the soft water.

In testimony that I claim the foregoing as my own, I have hereto affixed my signature in the presence of two witnesses.

JOHN ANTON UNGLAUB.

Witnesses:
  C. M. POTTER,
  L. B. DE LA.